US012756114B2

(12) United States Patent
Li et al.

(10) Patent No.: US 12,756,114 B2
(45) Date of Patent: Oct. 6, 2026

(54) DIPOLE ANTENNA UNIT AND BASE STATION ANTENNA

(71) Applicant: Suzhou Luxshare Technology Co., Ltd., Suzhou City (CN)

(72) Inventors: Zhenhua Li, Suzhou City (CN); Chengyu Xu, Suzhou City (CN); Wenkai Xu, Suzhou City (CN); Gang Zhou, Suzhou City (CN)

(73) Assignee: SUZHOU LUXSHARE TECHNOLOGY CO., LTD., Suzhou City (CN)

( * ) Notice: Subject to any disclaimer, the term of this patent is extended or adjusted under 35 U.S.C. 154(b) by 640 days.

(21) Appl. No.: 18/125,792

(22) Filed: Mar. 24, 2023

(65) Prior Publication Data

US 2024/0204423 A1 Jun. 20, 2024

(30) Foreign Application Priority Data

Dec. 14, 2022 (CN) ......................... 202211607644.8

(51) Int. Cl.

*H01Q 21/26* (2006.01)
*H01Q 1/24* (2006.01)
*H01Q 1/48* (2006.01)
*H01Q 9/16* (2006.01)
*H01Q 19/10* (2006.01)

(52) U.S. Cl.

CPC ............. *H01Q 21/26* (2013.01); *H01Q 1/246* (2013.01); *H01Q 1/48* (2013.01); *H01Q 9/16* (2013.01); *H01Q 19/10* (2013.01)

(58) Field of Classification Search

CPC .......... H01Q 21/26; H01Q 1/246; H01Q 1/48; H01Q 9/16; H01Q 19/10

See application file for complete search history.

(56) References Cited

U.S. PATENT DOCUMENTS

2012/0146872 A1* 6/2012 Chainon ................ H01Q 19/24 343/818
2015/0295313 A1* 10/2015 Zimmerman ............ H01Q 5/42 343/810
2017/0324171 A1* 11/2017 Shehan .................... H01Q 5/30

(Continued)

FOREIGN PATENT DOCUMENTS

CN 104733844 A 6/2015
CN 106104914 A 11/2016

(Continued)

*Primary Examiner* — Dieu Hien T Duong

(74) *Attorney, Agent, or Firm* — Birch, Stewart, Kolasch & Birch, LLP

(57) ABSTRACT

A dipole antenna unit and a base station antenna are disclosed. The dipole antenna unit includes two support plates, each support plate being provided with a first copper-clad region, the first copper-clad region including a balun and a first dipole arm connected to the balun, and a second dipole arm coupled to the first dipole arm in a non-contact manner is further arranged. Therefore, the dipole antenna unit and the base station antenna using the same according to the embodiments of the present disclosure have high hetero-polarization isolation and a high cross polarization ratio, an intermodulation index is improved, a structure is stable and reliable, and reduction of an overall size of the dipole antenna unit and the base station antenna is facilitated.

16 Claims, 11 Drawing Sheets

(56) References Cited

U.S. PATENT DOCUMENTS

| | | | | |
|---|---|---|---|---|
| 2019/0280377 | A1 | 9/2019 | Zhang et al. | |
| 2021/0210840 | A1 | 7/2021 | Xu et al. | |
| 2024/0039159 | A1* | 2/2024 | Zhang | H01Q 5/42 |

FOREIGN PATENT DOCUMENTS

| | | | |
|---|---|---|---|
| CN | 106785360 | A | 5/2017 |
| CN | 211126032 | U | 7/2020 |
| CN | 212412195 | U | 1/2021 |
| CN | 212542676 | U | 2/2021 |
| CN | 216015705 | U | 3/2022 |

* cited by examiner

DIPOLE ANTENNA UNIT AND BASE STATION ANTENNA

CLAIM OF PRIORITY AND CROSS-REFERENCE TO RELATED APPLICATION(S)

This application claims the benefit of Chinese Patent Application No. 202211607644.8, filed on Dec. 14, 2022, which is incorporated herein by reference in its entirety.

BACKGROUND OF THE INVENTION

1. Field of the Invention

The present invention relates to the field of communication, and particularly to a dipole antenna unit and a base station antenna.

2. Description of the Related Art

The development of communication technology has brought the base station antenna, an essential device in mobile communication technology, into the focus of research in recent years. The performance of an antenna dipole, a vital component of the base station antenna, directly affects the quality of communication. As the base station antenna develops towards multi-frequency, miniaturization and complexity, how to achieve better performance indexes in frequency sub-bands of the same antenna has gradually become an important requirement for design of the base station antenna. Since an existing antenna dipole is large-sized, the isolation between two adjacent dipoles in an array is unsatisfactory under the condition of limited dipole spacing. In order to improve the isolation between the dipoles, it's common practice to add isolators on dipole arms or increase the height of the dipoles. However, adding isolators will affect the performance of a radiation pattern and increase the production cost, and increasing the height of the dipoles will expand the overall size of the antenna while the unit size of the horizontal plane is reduced.

BRIEF DESCRIPTION OF THE INVENTION

In view of this, the present disclosure provides a dipole antenna unit and a base station antenna, which may solve or improve at least some of problems existing in the prior art.

According to one aspect of the present disclosure, there is provided a dipole antenna unit. The dipole antenna unit includes two support plates, the two support plates being perpendicularly crossed, each support plate being provided with a first copper-clad region, and the first copper-clad region including a balun and a first dipole arm connected to the balun; where the dipole antenna unit is further provided with a second dipole arm, the second dipole arm being coupled to the first dipole arm in a non-contact manner.

In some embodiments, a top corner of one end, away from the balun and the second dipole arm, of the first dipole arm is provided with a first corner cut.

In some embodiments, the support plate is further provided with a second copper-clad region, the second copper-clad region being spaced from the first copper-clad region, the second copper-clad region serving as the second dipole arm, and a coupling gap being formed between the second dipole arm and the first dipole arm.

In some embodiments, the first copper-clad region and the second copper-clad region are arranged on a surface of the same side of the support plate.

In some embodiments, the support plate is further provided with a third copper-clad region, the third copper-clad region being arranged on a side, facing away from the first copper-clad region, of the support plate, the third copper-clad region including a third dipole arm, and the third dipole arm being coupled to the first dipole arm and the second dipole arm separately in a non-contact manner.

In some embodiments, an orthogonal projection, on the support plate, of the third copper-clad region at least partially overlaps the first dipole arm, the second dipole arm and the coupling gap; and a total effective length of the first dipole arm, the second dipole arm and the third dipole arm is 0.25 times a wavelength of a center frequency of the dipole antenna unit.

In some embodiments, the second dipole arm is sheet metal, the second dipole arm is parallel to the support plate and extends in a direction away from the support plate, and a projection, on the support plate, of the second dipole arm at least partially overlaps the first dipole arm; the second dipole arm and the first copper-clad region are arranged on two surfaces, facing away from each other, of the support plate respectively; and alternatively a surface of the first copper-clad region is provided with a protective film, and the second dipole arm is at least partially arranged on the protective film.

In some embodiments, a total effective length of the second dipole arm and the first dipole arm is 0.25 times a wavelength of a center frequency of the dipole antenna unit.

In some embodiments, the second dipole arm includes a first portion and a second portion; the first portion is provided with a first end and a second end which are opposite each other, where the first end is opposite the first dipole arm, and the second end extends in a direction away from the first dipole arm; and a second portion provided with a third end and a fourth end which are opposite each other, where the third end is connected to a lower end of the second end of the first portion, the fourth end is located below the third end, the second portion is perpendicular to the first portion, and a joint between the second portion and the first portion forms a bent structure.

In some embodiments, the second dipole arm is provided with a second corner cut, and the second corner cut is arranged at the bent structure.

In some embodiments, a width of the first portion is 0.035 times the wavelength of the center frequency of the dipole antenna unit, and a length of the second portion is 0.02 times the wavelength of the center frequency of the dipole antenna unit.

In some embodiments, the balun includes a feed line and a grounding line; the feed line includes a bent microstrip line; and one end of the grounding line being connected to the feed line.

In some embodiments, the dipole antenna unit further includes a feed substrate, the feed substrate being provided with two feed wires; where the two support plates are arranged on the feed substrate, and the feed lines of the two support plates are connected to the corresponding feed wires respectively.

In some embodiments, a middle of the support plate is provided with a slot perpendicular to a bottom edge of the support plate, and the support plate includes two plate units located on two sides of the slot respectively; each plate unit is provided with the first copper-clad region and the second dipole arm separately, the first copper-clad regions on the two plate units are arranged in central symmetry with respect to the slot, and the second dipole arms on the two plate units are arranged in central symmetry with respect to the slot; and one of the two plate units of each support plate is provided with the grounding line, and the feed line is partially arranged on the other one of the two plate units.

In some embodiments, the dipole antenna unit further includes directors arranged above the support plate at a predetermined interval, each director having a directing substrate and a directing pattern arranged on the directing substrate.

In some embodiments, the directing substrate is provided with four directing arms, the four directing arms are arranged on the same plane and rotationally symmetrical with respect to a center of the director to form a vertical cross structure, an included angle between two adjacent directing arms is 90°, and extension directions of the directing arms are parallel to the corresponding support plates; a middle of the directing substrate is provided with a hollowed structure, the hollowed structure extending from a center of the director in the extension directions of the four directing arms to form a vertical cross structure; and the directing pattern and the directing substrate have the same shape but different sizes.

In some embodiments, a width of the directing arm is 0.08 times a wavelength of a center frequency of the dipole antenna unit; and the directing arm is provided with a tail end far away from the center of the director, where a distance between tail ends of two directing arms facing away from each other along the same straight line is 0.32 times the wavelength of the center frequency of the dipole antenna unit.

In some embodiments, a distance between the director and a top edge of the support plate is 0.05 times a wavelength of a center frequency of the dipole antenna unit.

According to another aspect of the present disclosure, there is provided a base station antenna. The base station antenna includes: a reflector; and a plurality of the dipole antenna units according to the first aspect, the dipole antenna units being mounted on the reflector.

In accordance with the abovementioned dipole antenna unit and a base station antenna, the dipole antenna unit and the base station antenna using the same according to the embodiments of the present disclosure have high hetero-polarization isolation and a high cross polarization ratio, an intermodulation index is improved, a structure is stable and reliable, and reduction of an overall size of the dipole antenna unit and the base station antenna is facilitated. In addition, the dipole antenna unit and the base station antenna according to the embodiments of the present disclosure reduce use of metal isolators, so as to reduce influence of the isolators on a radiation pattern and effectively reduce cost.

BRIEF DESCRIPTION OF THE DRAWINGS

The above and other objectives, features and advantages of the present disclosure will become more apparent from description of embodiments of the present disclosure below with reference to accompanying drawings. In the figures.

DETAILED DESCRIPTION OF EMBODIMENTS OF THE INVENTION

Several preferred embodiments of the present disclosure will be described in detail in conjunction with the accompanying drawings as follows, however, the present disclosure is intended to encompass any substitutions, modifications, equivalents, etc., made thereto without departing from the spirit and scope of the present disclosure. In order to provide those skilled in the art with thorough understanding of the present disclosure, particular details will be described below in the preferred embodiments of the present disclosure, although those skilled in the art can understand the present disclosure without the description of these details.

Figure 1:
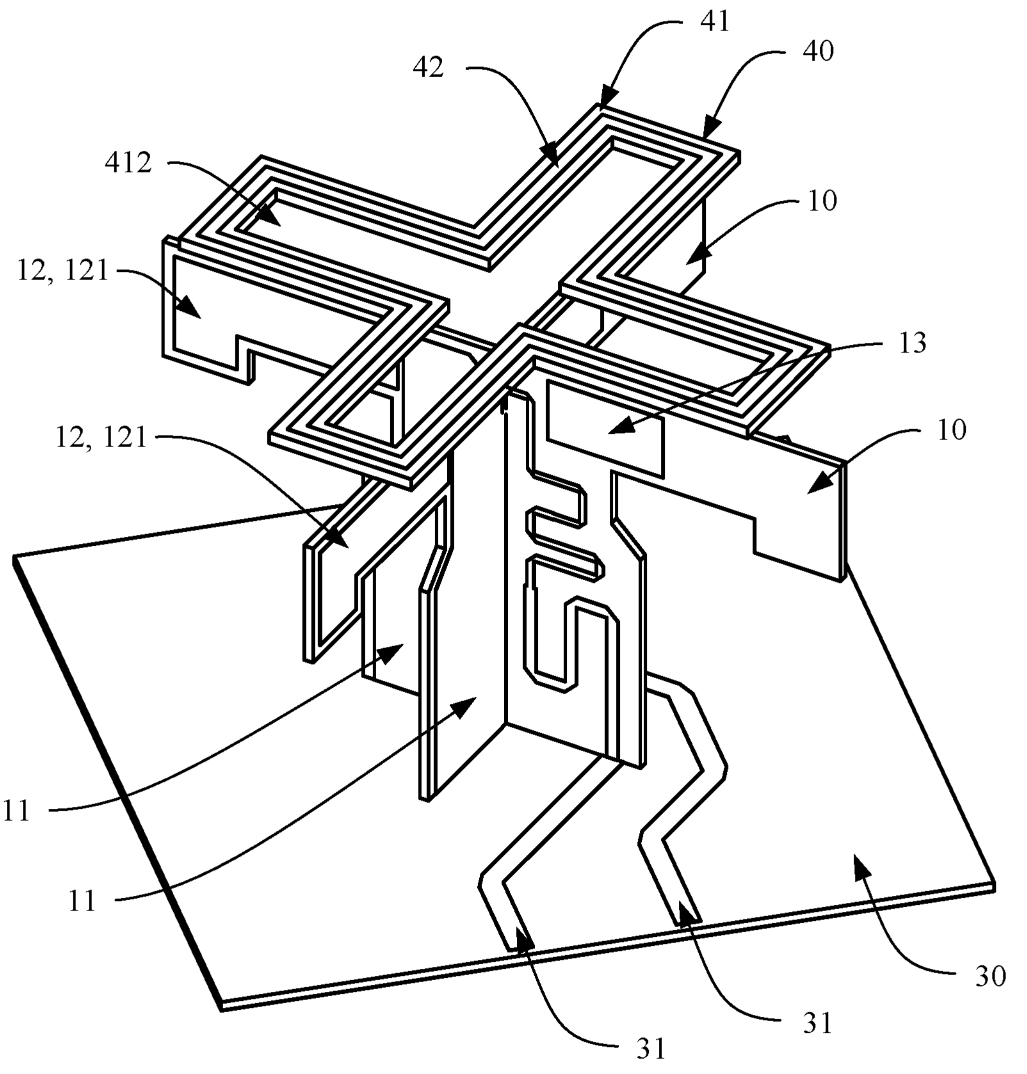
FIG. 1 is a schematic diagram of a solid structure of a dipole antenna unit according to an embodiment of the present disclosure.
Figure 2:
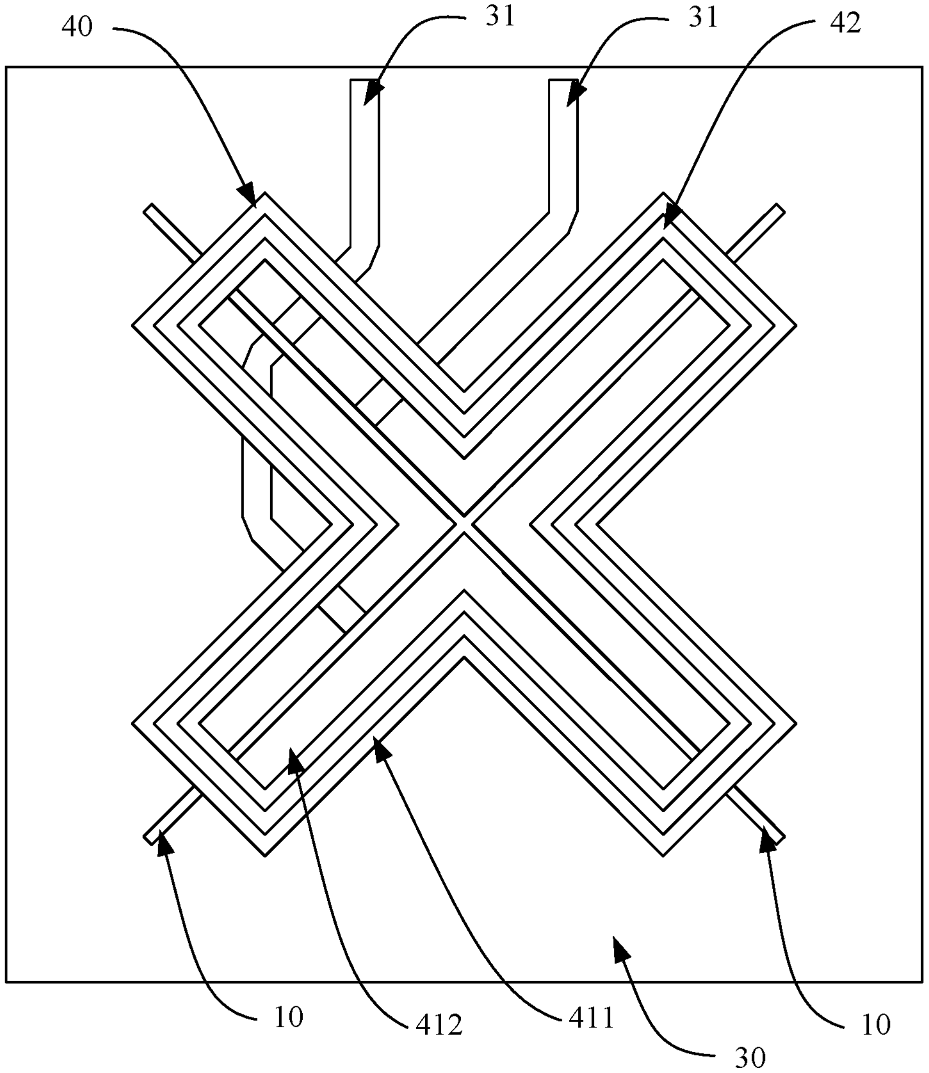
FIG. 2 is a schematic diagram of a top view of a dipole antenna unit according to an embodiment of the present disclosure.
Figure 3:
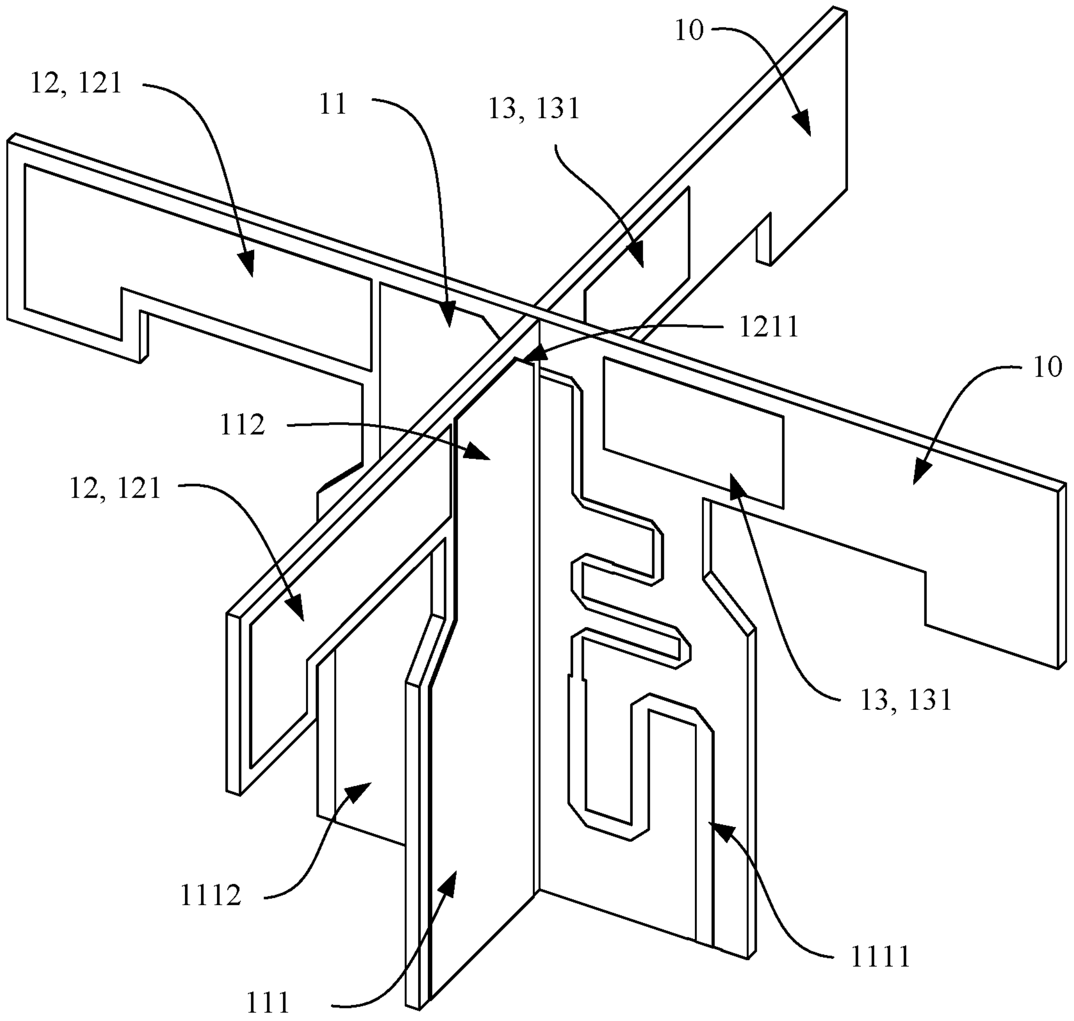
FIG. 3 is a schematic diagram of connection of two support plates according to an embodiment of the present disclosure.
Figure 8:
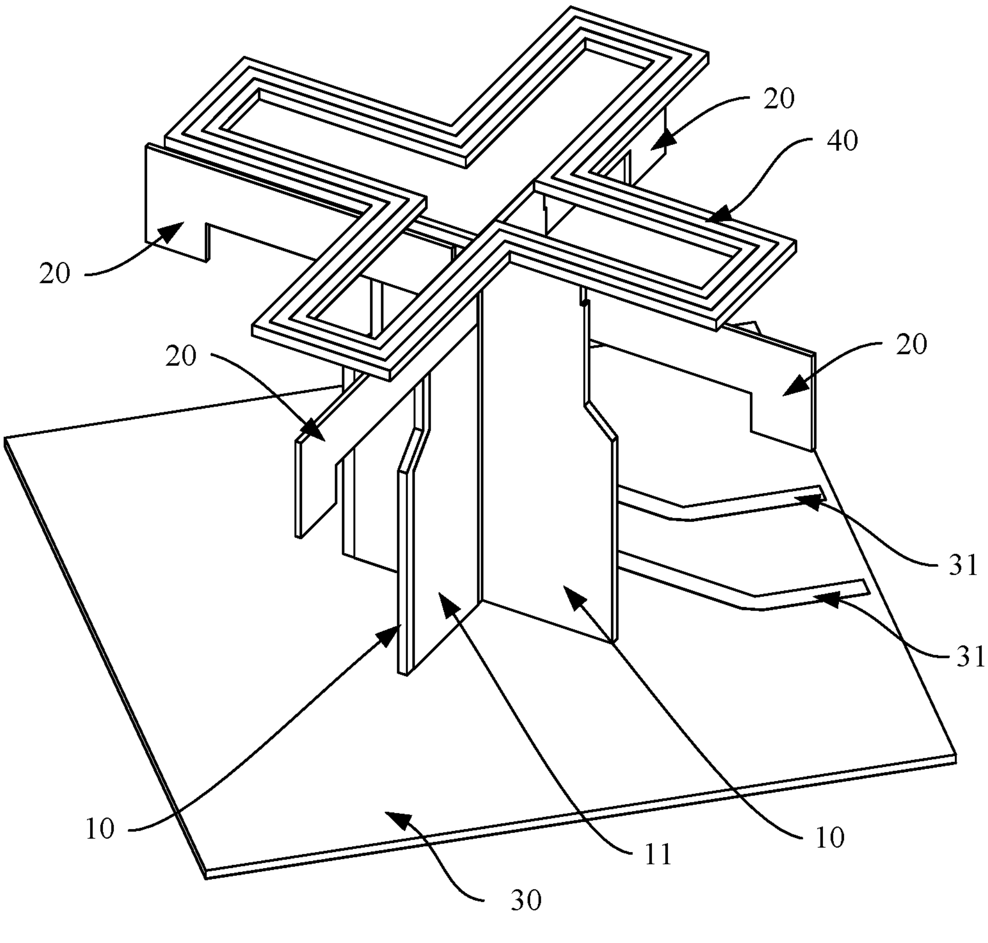
FIG. 8 is a schematic diagram of a solid structure of a dipole antenna unit according to yet another embodiment of the present disclosure.
Figure 9:
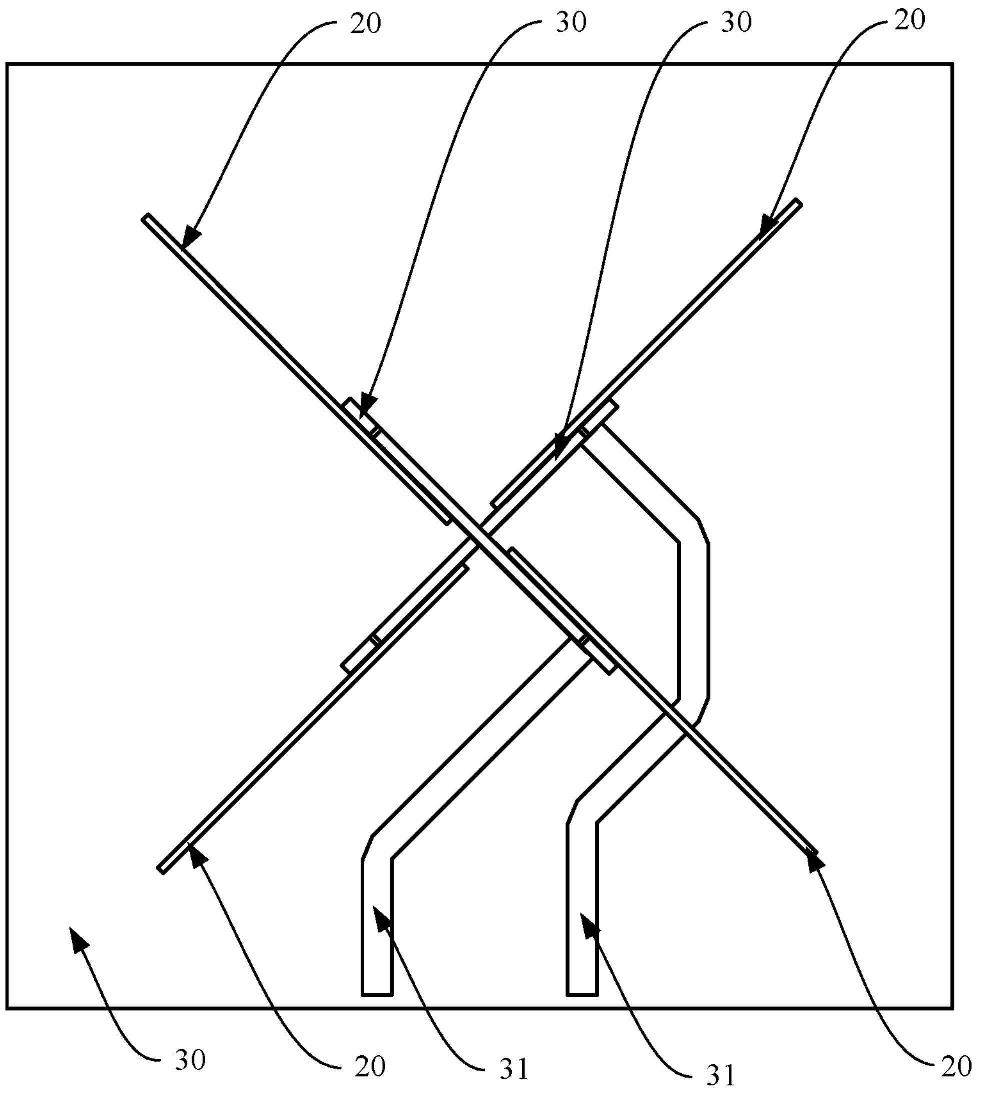
FIG. 9 is a schematic diagram of a top view of a support plate and a feed substrate according to yet another embodiment of the present disclosure.

FIGS. 1 and 2 are schematic structural diagrams of a dipole antenna unit according to an embodiment of the present disclosure, and FIG. 8 is a schematic structural diagram of a dipole antenna unit in another embodiment. With reference to FIGS. 1, 2, and 8, the dipole antenna unit of the embodiments of the present disclosure includes two support plates 10. With reference to FIGS. 1-3, and FIGS. 8 and 9, the two support plates 10 are arranged crosswise to form a cross shape, and the two support plates 10 are basically perpendicular to each other. Optionally, a middle of the support plate 10 is provided with a slot 14, the slot 14 is perpendicular to a bottom edge of the support plate 10. By inserting one support plate 10 into the slot 14 of the other support plate 10, the two support plates 10 may be connected. In an optional embodiment, the slot 14 of one support plate 10 extends to the bottom edge of the support plate 10, and the slot 14 of the other support plate 10 extends to a top edge of the support plate 10.

FIGS. 4-7, and FIGS. 10 and 12 show front views of a support plate 10 according to several different embodiments. The support plate 10 in FIGS. 4 and 5 corresponds to the support plate 10 in FIGS. 1-3, and FIG. 5 is a schematic diagram of a back of the support plate 10 shown in FIG. 4. With reference to FIGS. 1-7, and FIGS. 10 and 12, the support plate 10 includes two plate units 15 located on two sides of the slot 14 relative to a position of the slot 14. The two plate units 15 may be symmetrically arranged in shape with the slot 14 as a symmetry axis.

In this embodiment, the support plate 10 may be a printed circuit board (PCB). Further, the support plate 10 may be a copper-clad plate, and the support plate 10 includes an insulating substrate and a metal copper layer arranged on the insulating substrate, and the metal copper layer is formed in a predetermined shape. In some embodiments, the support plate 10 is provided with a first copper-clad region 11, and the first copper-clad region 11 is a continuous copper layer. The first copper-clad region 11 includes a balun 111 and a first dipole arm 112. The first dipole arm 112 is connected to the balun 111, and the first dipole arm 112 is arranged above the balun 111. Compared with a die casting process, a dipole in the form of printed circuit board features more stable intermodulation. Metal isolators are omitted, so as to reduce influence of the isolators on a radiation pattern, and further effectively reduce cost.

As shown in FIGS. 1-2 and FIGS. 8 and 9, the dipole antenna unit further includes a feed substrate 30, the feed substrate 30 being provided with two feed wires 31. The feed wire 31 may be arranged on an upper surface of the feed substrate 30, and the feed wire 31 is connected to the feed line 1111 of the support plate 10, so as to achieve feeding. Optionally, the feed substrate 30 uses a printed circuit board, and the feed wire 31 may be a metal conductive pattern printed on the feed substrate 30. In an alternative embodiment, the balun 111 includes a feed line 1111 and a grounding line 1112. A lower end of the grounding line 1112 extends to the feed substrate 30 and is grounded. One end of the grounding line 1112 is connected to the feed line 1111. For embodiment, the feed line 1111 may be connected to the grounding line 1112 from a side. The feed line 1111 includes a bent microstrip line. The two support plates 10 are arranged on the feed substrate 30 and are perpendicular to the feed substrate 30. The feed substrate 30 is provided with two feed wires 31, and the feed lines 1111 of the two support plates 10 are connected to the corresponding feed wires 31 for feeding. In an embodiment, the two feed lines 1111 are orthogonally arranged at ±45 degrees, and feed power into the first dipole arms 112 on the two support plates 10 respectively. Therefore, the first dipole arms 112 is directly fed with power, facilitating guarantee of feeding reliability. Optionally, the grounding lines 1112 are also orthogonally arranged at ±45 degrees, and are connected to the corresponding first dipole arms 112 respectively. In the case of a large current or a surge, the first dipole arms 112 may conduct the current or surge to the ground through the grounding lines 1112.

In the embodiments, with reference to FIGS. 3-7, a top corner of one end, away from the balun 111 and the second dipole arm 121, 20, of the first dipole arm 112 is provided with a first corner cut 1121. The first corner cut 1121 may be a shape of an arc (with reference to FIG. 7), a straight line (with reference to FIGS. 3-6) or other shapes. By arranging the first corner cut 1121, orthogonality of two polarizations may be increased, and isolation may be enhanced.

In the embodiments of the present disclosure, as shown in FIGS. 1-12, the dipole antenna unit is further provided with a second dipole arm 121, 20, the second dipole arm (121, 20) being coupled to the first dipole arm 112 in a non-contact manner. Therefore, the dipole antenna unit of this embodiment uses a multi-coupling manner combining a direct feeding mode and a non-contact feeding manner, and multi-coupling is conducive to enhancing the isolation performance of the dipole antenna unit under the condition of guarantee of normal performance of the dipole antenna unit.

In some embodiments, with reference to FIGS. 1-7, the second dipole arm 121 may be a copper-clad region arranged on the support plate 10. Specifically, the support plate 10 is further provided with a second copper-clad region 12, the second copper-clad region 12 serving as the second dipole arm 121. Optionally, the first copper-clad region 11 and the second copper-clad region 12 are arranged on a surface of the same side of the support plate 10. The second copper-clad region 12 is spaced from the first copper-clad region 11, and a coupling gap 17 is formed between the second dipole arm 121 and the first dipole arm 112, and non-contact feeding between the second dipole arm 121 and the first dipole arm 112 is achieved by means of the coupling gap 17. A specific size of the coupling gap 17 may be designed according to necessary features of the dipole antenna unit.

Further, in an embodiment, the support plate 10 is further provided with a third copper-clad region 13, third copper-clad region 13 serving as a third dipole arm 131, the third dipole arm 131 being coupled to the first dipole arm 112 and the second dipole arm 121 separately in a non-contact manner. Optionally, the third copper-clad region 13 is arranged on a side, facing away from the first copper-clad region 11 and the second copper-clad region 12, of the support plate 10, the third dipole arm 131 being electromagnetically coupled to the first dipole arm 112 and the second dipole arm 121 separately for feeding. Optionally, an orthogonal projection, on the support plate 10, of the third copper-clad region 13 at least partially overlaps the first dipole arm 112, the second dipole arm 121 and the coupling gap 17, so as to guarantee that the third dipole arm 131 has parallel and opposite regions with the first dipole arm 112 and the second dipole arm 121 respectively. A total effective length of the first dipole arm 112, the second dipole arm 121 and the third dipole arm 131 is 0.25 times a wavelength of a center frequency of the dipole antenna unit. Through such design, the dipole antenna unit of this embodiment uses a multi-coupling manner, and multi-coupling is conducive to enhancing the isolation performance of the dipole antenna unit under the condition of guarantee of normal performance of the dipole antenna unit, such that hetero-polarization isolation of the dipole antenna unit and an array composed of dipole antenna units may reach a high isolation level of −30 dB, and reduction of a volume of the dipole antenna unit is facilitated as well.

In other embodiments, with reference to FIGS. 8-12, the second dipole arm 20 is sheet metal, the sheet metal being connected to the support plate 10, for embodiment, the sheet metal may be fixed on the support plate 10 by bonding, pressing or other means. The second dipole arm 20 is parallel to the support plate 10 and extends in a direction away from the support plate 10, and a projection, on the support plate 10, of the second dipole arm 20 at least partially overlaps the first dipole arm 112 for coupling. In an optional embodiment, with reference to FIG. 12, the second dipole arm 20 and the first copper-clad region 11 are arranged on two surfaces, facing away from each other, of the support plate 10 respectively, and the second dipole arm 20 and the first dipole arm 112 are coupled in a non-contact manner for feeding. In another optional embodiment, with reference to FIGS. 10 and 11, a surface of the first copper-clad region 11 is provided with a protective film 16, and the second dipole arm 20 is at least partially arranged on the protective film 16. The protective film 16 isolates the first copper-clad region 11 from the second dipole arm 20, and the second dipole arm 20 and the first dipole arm 112 are coupled in a non-contact manner for feeding. The protective film 16 may be a liquid photo-imageable solder mask on a surface of a printed circuit board. A total effective length of the second dipole arm 20 and the first dipole arm 112 is 0.25 times the wavelength of the center frequency of the dipole antenna unit, so as to guarantee radiation performance of the dipole antenna unit while an overall size of the dipole antenna unit is reduced.

Figure 4:
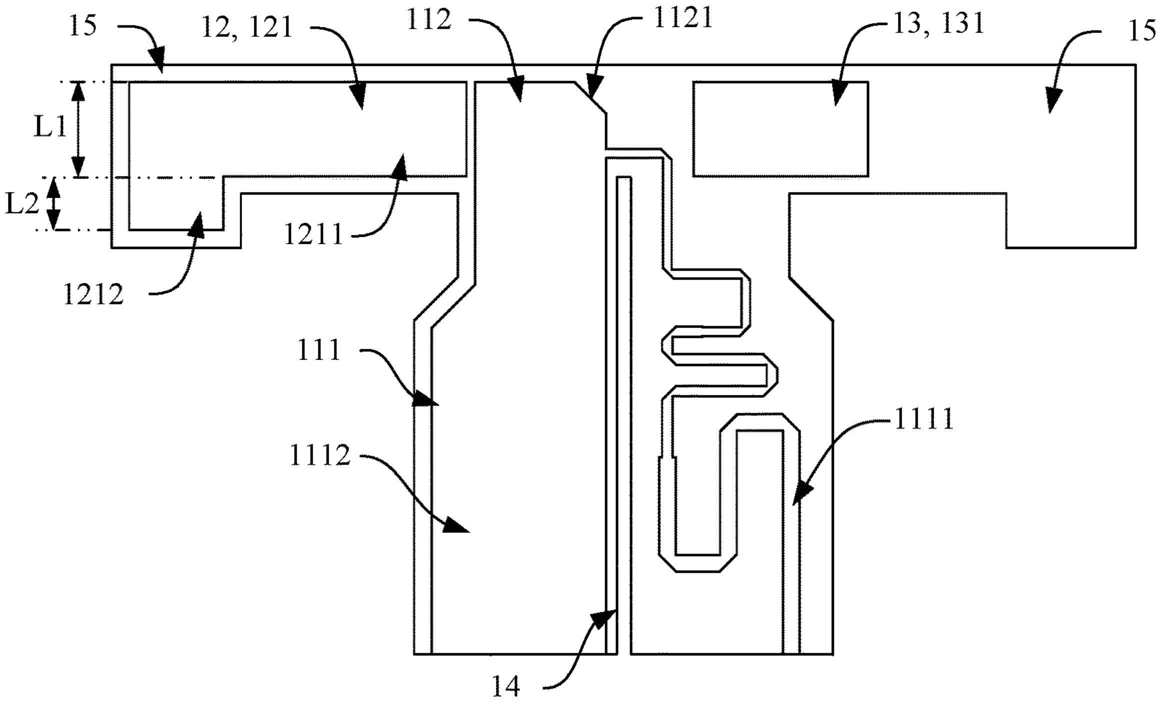
FIG. 4 is an orthogonal projection view of one side of a support plate according to an embodiment of the present disclosure.
Figure 5:
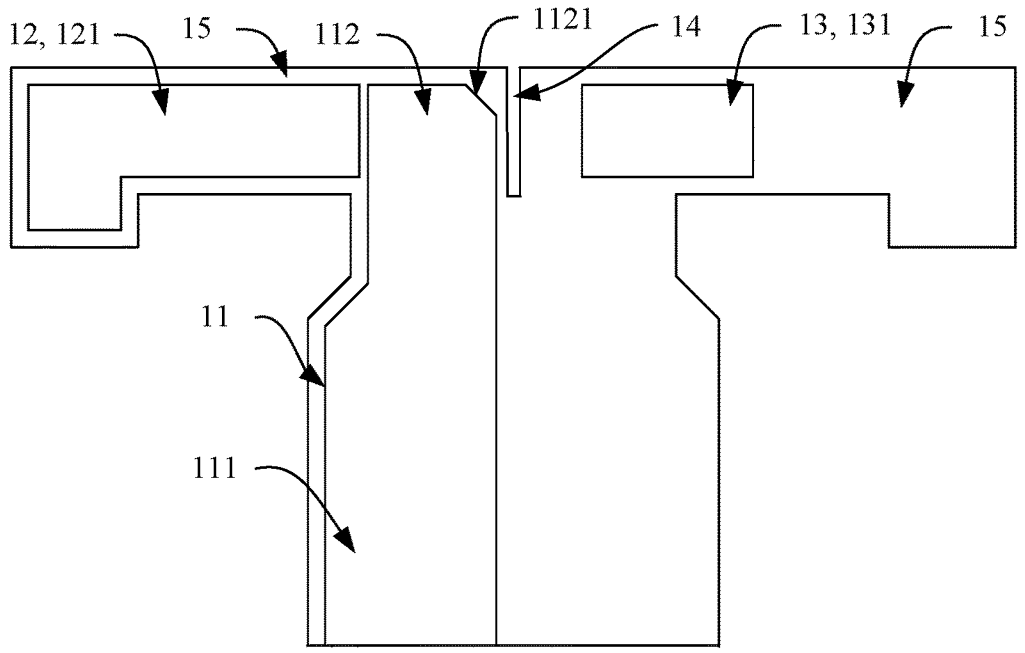
FIG. 5 is an orthogonal projection view of the other side of a support plate according to an embodiment of the present disclosure.
Figure 10:
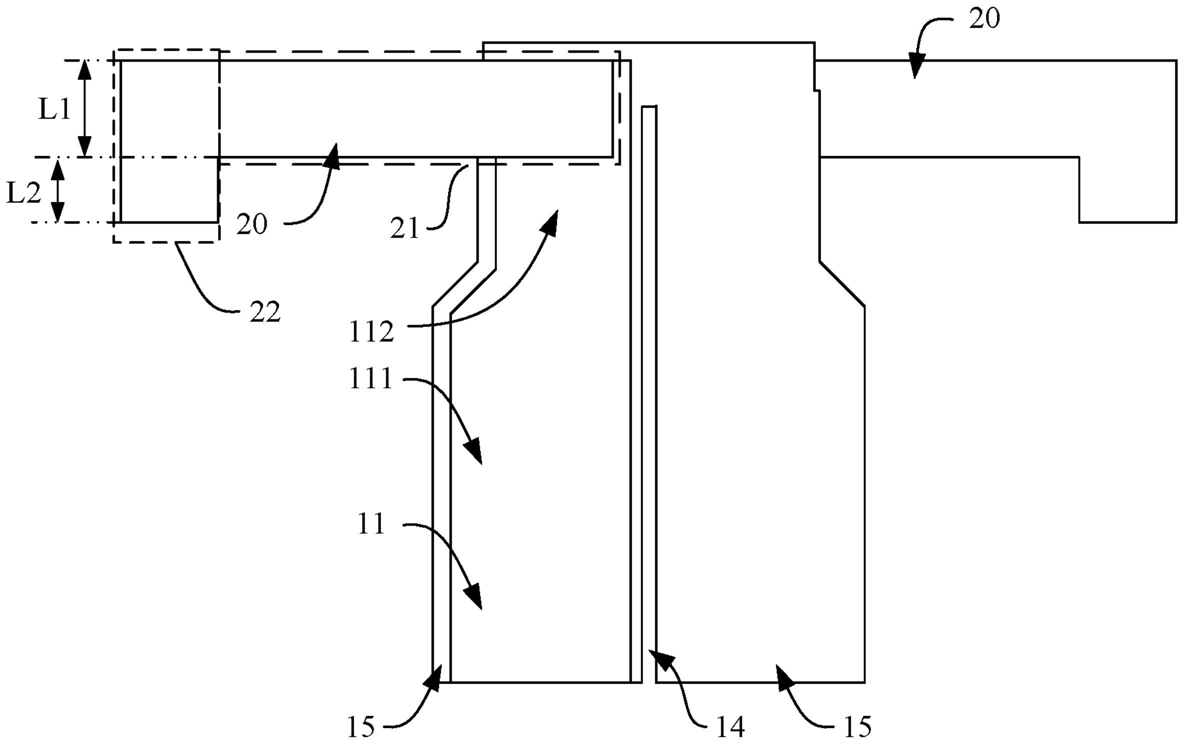
FIG. 10 is a front view of connection between a support plate and a second dipole arm according to yet another embodiment of the present disclosure.
Figure 11:
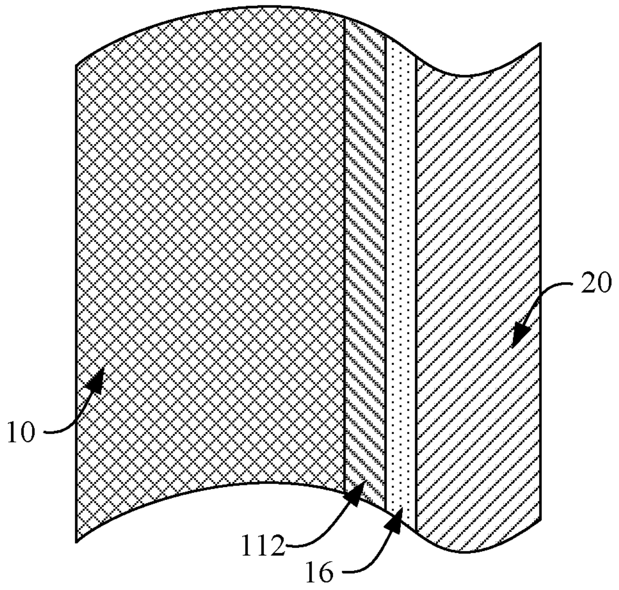
FIG. 11 is a schematic diagram of a side view of connection between a support plate and a second dipole arm according to yet another embodiment of the present disclosure.

In some embodiments, with reference to FIGS. 4 and 10, the second dipole arm 121 and 20 includes a first portion 1211 and 21 and a second portion 1212 and 22 which are connected. The first portion 1211 and 21 is strip-shaped and is provided with a first end and a second end which are opposite each other, where the first end is opposite the first dipole arm 112, and the second end extends in a direction away from the first dipole arm 112. The second portion 1212 and 22 is provided with a third end and a fourth end which are opposite each other, where the third end is connected to a lower end of the second end of the first portion 1211 and 21, the fourth end is located below the third end, the second portion 1212 and 22 is perpendicular to the first portion 1211 and 21, and a joint between the second portion 1212 and 22 and the first portion 1211 and 21 forms a bent structure. That is, the second dipole arms 121 and 20 are formed in an approximately L-shaped structure. By arranging the second dipole arm 121 and 20 to have a bent structure, a length of the second dipole arms 121 and 20 in a horizontal direction is reduced, so as to facilitate reduction of the overall volume of the dipole antenna unit while the radiation performance of the dipole antenna unit is guaranteed.

Optionally, with reference to FIGS. 4 and 10, a width L1 of the first portions 1211 and 21 is 0.035 times the wavelength of the center frequency of the dipole antenna unit, and a length L2 of the second portions 1212 and 22 is 0.02 times the wavelength of the center frequency of the dipole antenna element. Through such design, the second dipole arm 121 and 20 has a large width, the bent structure of the second dipole arm 121 and 20 is combined, so as to facilitate reduction of the overall volume of the dipole antenna unit while the radiation performance of the dipole antenna unit is guaranteed.

Figure 6:
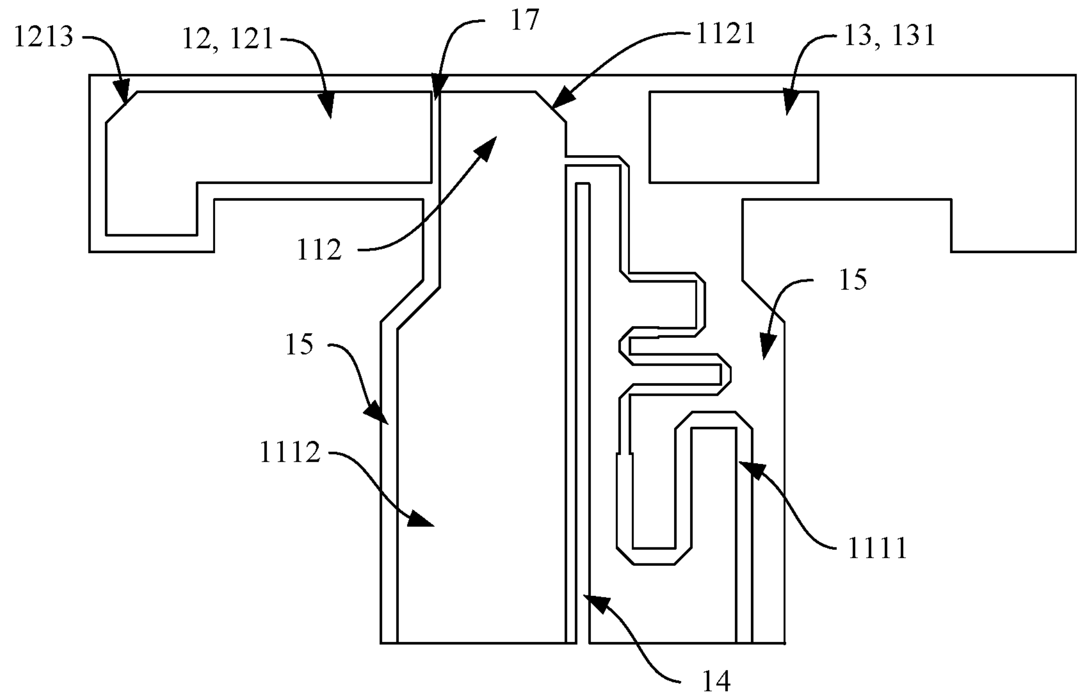
FIG. 6 is an orthogonal projection view of one side of a support plate according to another embodiment of the present disclosure.
Figure 7:
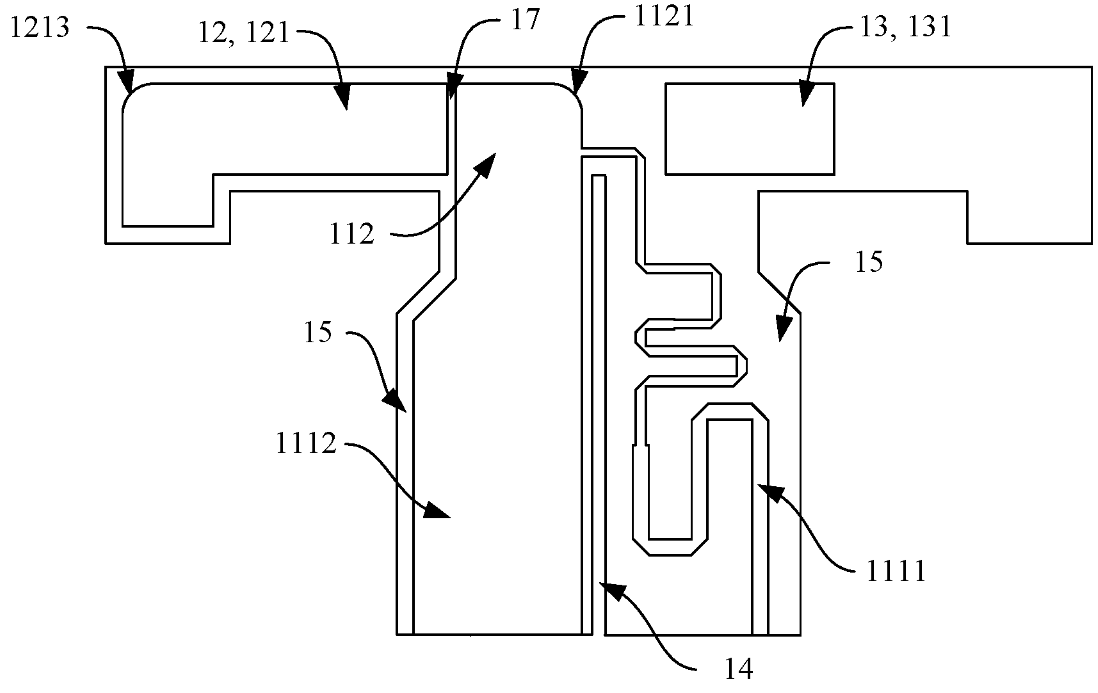
FIG. 7 is an orthogonal projection view of one side of a support plate according to still another embodiment of the present disclosure.
Figure 12:
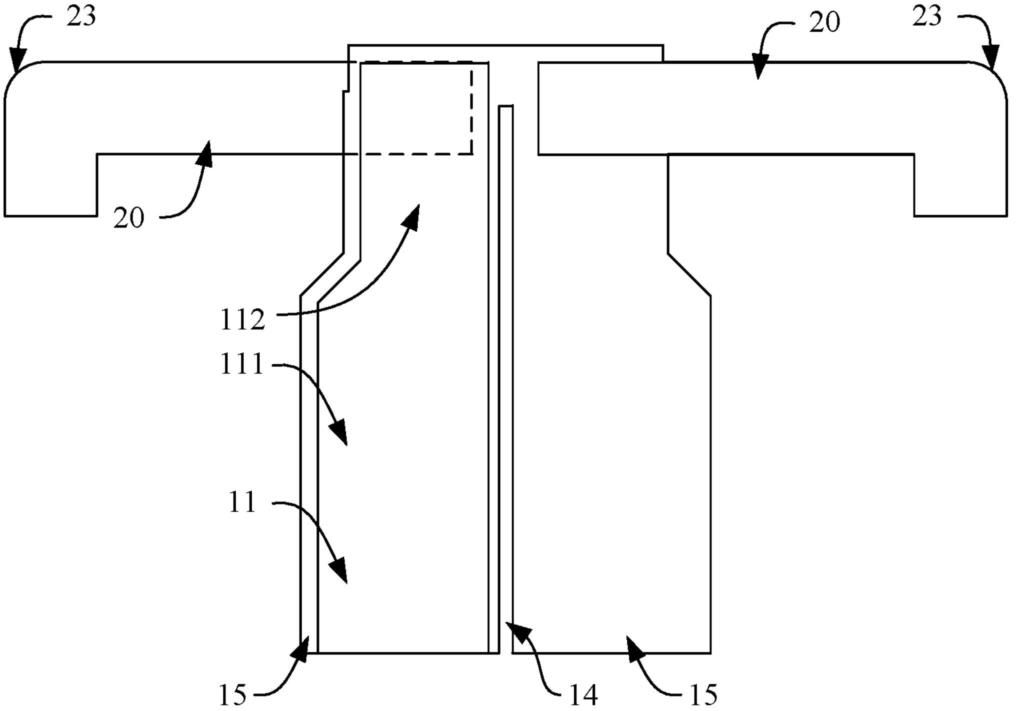
FIG. 12 is a schematic diagram of connection between a support plate and a second dipole arm according to yet another embodiment of the present disclosure.
Figure 13:
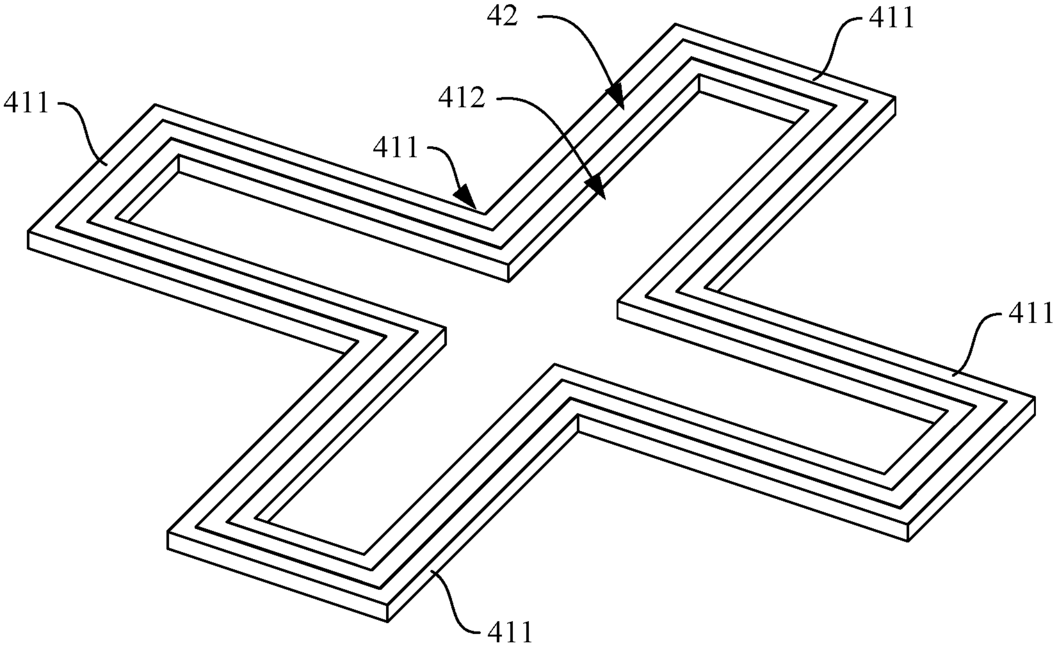
FIG. 13 is a schematic diagram of a solid structure of a director according to an embodiment of the present disclosure.

With reference to FIGS. 6, 7 and 12, in some embodiments, the second dipole arm 121 and 20 is provided with a second corner cut 1213 and 23, and the second corner cut 1213 and 23 is arranged at the bent structure. The second corner cut 1213 and 23 may be a shape of an arc (with reference to FIGS. 7 and 12), a straight line (with reference to FIG. 6) or other shapes. By arranging the second corner cut 1213 and 23, orthogonality of two polarizations may be increased, and isolation may be further enhanced, such that the dipole antenna unit has high isolation and a high cross polarization ratio.

Each plate unit 15 is provided with the first copper-clad region 11 and the second dipole arm 121 and 20 separately, the first copper-clad regions 11 on the two plate units 15 are arranged in central symmetry with respect to the slot 14, and the second dipole arms 121 and 20 on the two plate units 15 are arranged in central symmetry with respect to the slot 14. One of the two plate units 15 of each support plate 10 is provided with the grounding line 1112, and the feed line 1111 is partially arranged on the other one of the two plate units 15, that is, the feed line 1111 recedes and crosses the slot 14 on the support plate 10 to connect to the grounding line 1112 and the first dipole arm 112.

A contour shape of the support plate 10 may be arranged according to a shape of the copper-clad regions on the support plate 10, such that there is a predetermined gap between each copper-clad region (such as the first copper-clad region 11, the second copper-clad region 12 and/or the third copper-clad region 13) and an edge of the support plate 10. For embodiment, with reference to FIGS. 3-7 and FIGS. 11 and 12, the two plate units 15 of the support plate 10 are approximately inverted J-shaped structures separately, and the first copper-clad region 11, the second copper-clad region 12 and the third copper-clad region 13 have small gaps with the edge of the support plate 10. Through such design, reduction of the overall size of the dipole antenna unit is facilitated.

The dipole antenna unit further includes directors 40, the directors 40 are arranged above the support plate 10 and are spaced from a top edge of the support plate 10 by a predetermined interval, and each director 40 has a directing substrate 41 and a directing pattern 42 arranged on the directing substrate 41. Optionally, the director 40 may be a printed circuit board, the directing substrate 41 may be an insulating substrate, and the directing pattern 42 may be a patterned conductive metal layer printed on the directing substrate 41. An electromagnetic signal of the dipole arm may be directed by the directing pattern 42, and an anti-interference capacity of the dipole antenna unit may be enhanced. Preferably, the distance between the director 40 and the top edge of the support plate 10 is 0.05 times the wavelength of the center frequency of the dipole antenna unit, which is conducive to guarantee of a directing effect of the director 40 on the electromagnetic signal.

The directing substrate 41 is provided with four directing arms 411, the four directing arms 411 are arranged on the same plane and rotationally symmetrical with respect to a center of the director 40 to form a vertical cross structure, an included angle between two adjacent directing arms 411 is 90°, extension directions of the directing arms 411 are parallel to the corresponding support plates 10, and a center of the director base plate 41 is basically aligned with the slots 14 of the two support plates 10. In other words, the four directing arms 411 are connected to form a cross-like profile. A middle of the directing substrate 41 is provided with a hollowed structure 412, the hollowed structure 412 extending from a center of the director 40 in the extension directions of the four directing arms 411 to form a vertical cross structure. In other words, the hollowed structure 412 is a cross-shaped hollowed-out hole provided in the middle of the directing substrate 41, each side of the hollowed structure 412 corresponds to one side of the corresponding directing arm 411 in a one-to-one manner, and the directing substrate 41 is a cross-shaped plate structure with the cross-shaped hollowed structure 412 in the middle. The directing pattern 42 and the guiding substrate 41 have the same shape but different sizes, that is, the directing pattern 42 is a hollowed cross-shaped belt structure arranged on the directing substrate 41. Through such design, the director 40 may achieve a better signal directing effect.

Figure 14:
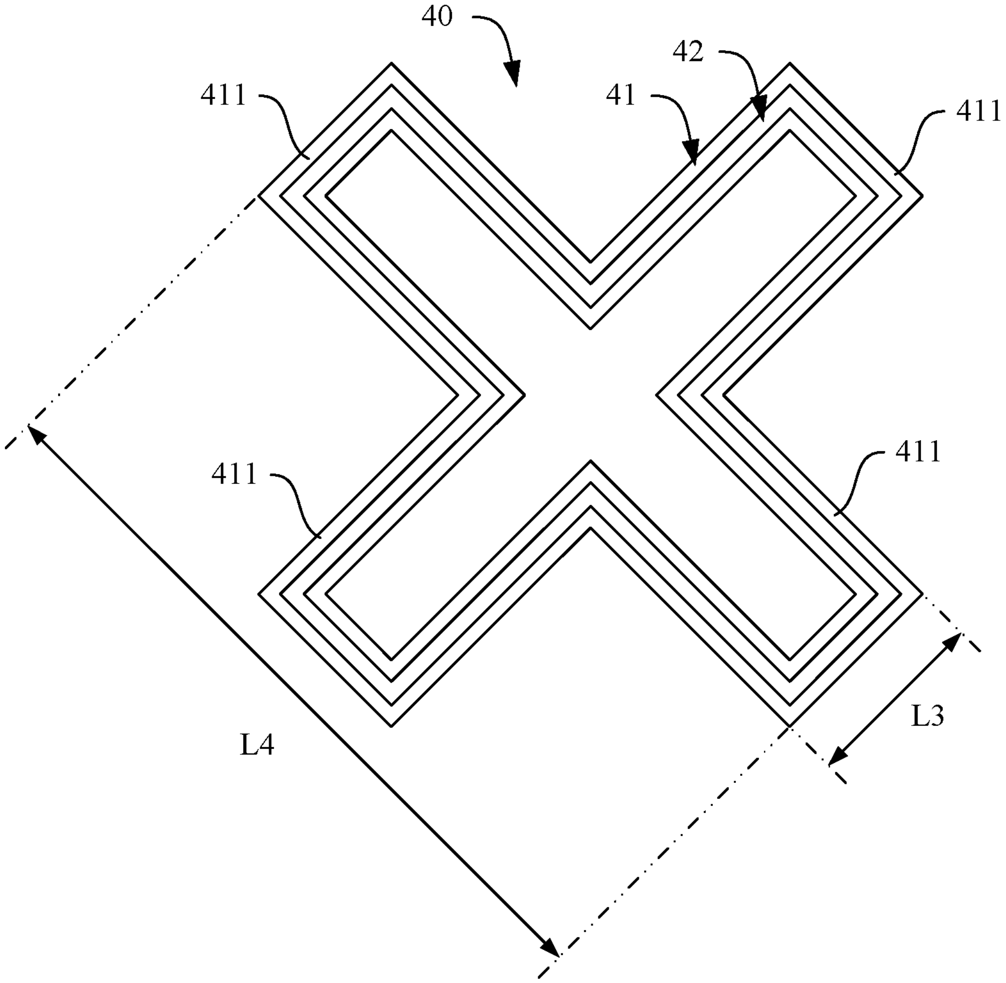
FIG. 14 is a top view of a director according to an embodiment of the present disclosure.

With reference to FIG. 14, in an embodiment, a width L3 of the directing arm 411 is 0.08 times the wavelength of the center frequency of the dipole antenna unit. The directing arm 411 is provided with a tail end far away from the center of the director 40, and a distance L4 between tail ends of two directing arms 411 facing away from each other along the same straight line is 0.32 times the wavelength of the center frequency of the dipole antenna unit. Through such design, the electromagnetic signal of the dipole arm may be directed well by the directing pattern, and the anti-interference capacity of the dipole antenna unit may be enhanced.

According to the dipole antenna unit of the embodiment of the present disclosure, the support plate 10 is provided with the first copper-clad region, the first copper-clad region 11 including the balun 111 and the first dipole arm 112 connected to the balun 111, and the second dipole arm 121 or 20 coupled to the first dipole arm 112 in a non-contact manner is further arranged. Therefore, the dipole antenna unit and the base station antenna using the same according to the embodiments of the present disclosure have high hetero-polarization isolation and a high cross polarization ratio, an intermodulation index is improved, a structure is stable and reliable, and reduction of an overall size of the dipole antenna unit and the base station antenna is facilitated. In addition, the dipole antenna unit and the base station antenna according to the embodiments of the present disclosure reduce use of metal isolators, so as to reduce influence of the isolators on a radiation pattern and effectively reduce cost.

Figure 15:
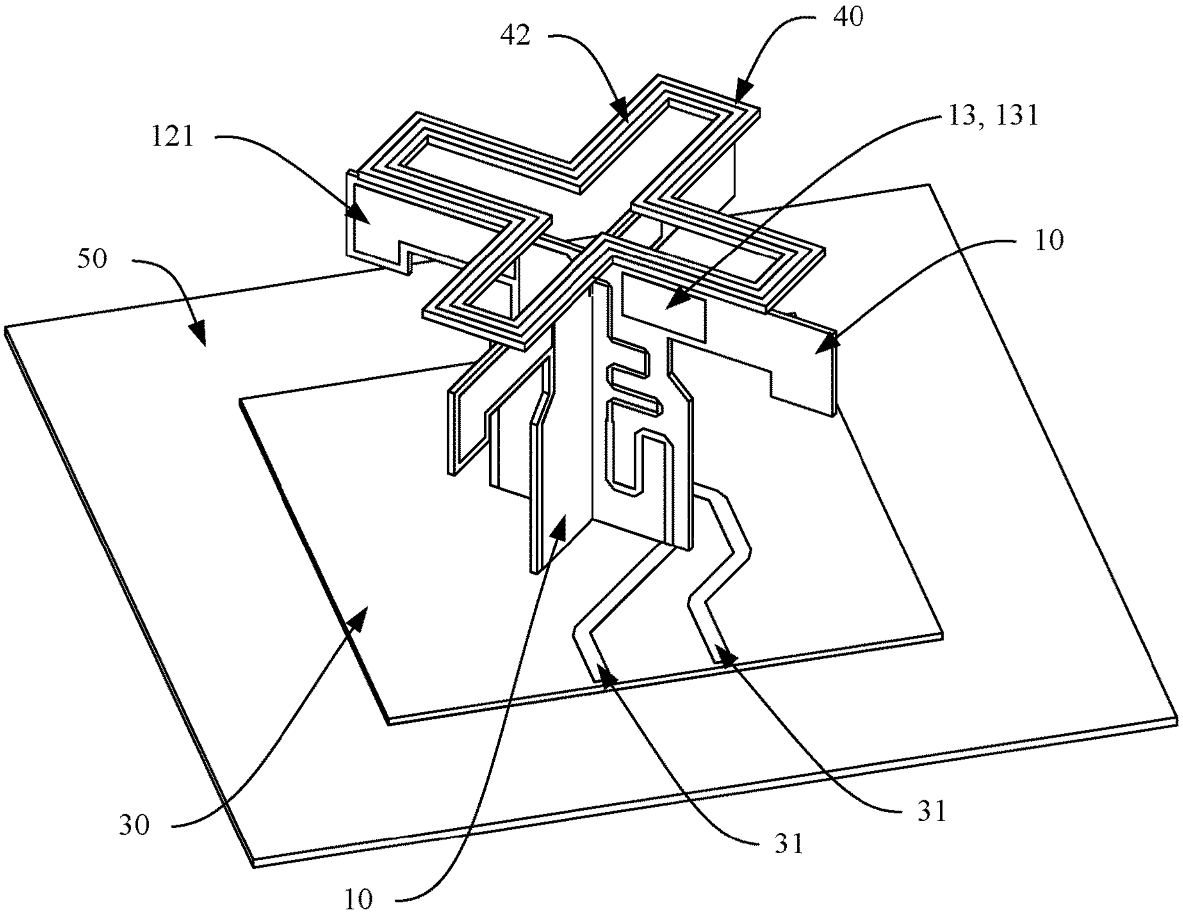
FIG. 15 is a schematic structural diagram of a base station antenna according to an embodiment of the present disclosure.

The embodiment of the present disclosure further relates to a base station antenna. FIG. 15 is a schematic structural diagram of a base station antenna according to an embodiment of the present disclosure. With reference to FIG. 15, the base station antenna includes a reflector 50, and the dipole antenna unit in at least an embodiment of the present disclosure, the dipole antenna unit being mounted on a top of the reflector 50. The base station antenna may include a plurality of dipole antenna units (only one dipole antenna element is schematically shown in FIG. 15), and the plurality of dipole antenna elements are arrayed in a predetermined arrangement manner. The reflector 50 is used for directional radiation of the dipole antenna unit. The reflector 50 may be a metal reflector 50, and the reflector 50 is arranged under the dipole antenna unit, so as to suppress backward radiation of the antenna and improve the gain of the antenna by using generated reflected beams.

According to the base station antenna in the embodiment of the present disclosure, the array composed of the plurality of dipole antenna units in at least some embodiments of the present disclosure is arranged on the reflector 50, thereby achieving directional radiation of a dual-polarized antenna element, and facilitating miniaturization of the base station antenna.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is intended that the scope of the present disclosure be defined by the claims appended hereto and their equivalents.

We claim:

1. A dipole antenna unit, comprising two support plates (10), the two support plates (10) being perpendicularly crossed, each support plate (10) being provided with a first copper-clad region (11), a second copper-clad region (12) and a third copper-clad region (13), the second copper-clad region (12) being spaced from the first copper-clad region (11), and the first copper-clad region (11) comprising a balun (111) and a first dipole arm (112) connected to the balun (111);

wherein the dipole antenna unit is further provided with a second dipole arm (121, 20), the second dipole arm (121, 20) being coupled to the first dipole arm (112) in a non-contact manner;

the second copper-clad region (12) serving as the second dipole arm (121), and a coupling gap (17) being provided between the second dipole arm (121) and the first dipole arm (112);

the support plate (10) is provided with a first side and a second side opposing to the first side, the first copper-clad region (11) and the second copper-clad region (12) are arranged on a surface of the first side of the support plate (10), the third copper-clad region (13) is arranged on the second side of the support plate (10), the third copper-clad region (13) comprising a third dipole arm (131), and the third dipole arm (131) being coupled to the first dipole arm (112) and the second dipole arm (121) separately in a non-contact manner.

2. The dipole antenna unit according to claim 1, wherein a top corner of one end, away from the balun (111) and the second dipole arm (121, 20), of the first dipole arm (112) is provided with a first corner cut (1121).

3. The dipole antenna unit according to claim 1, wherein an orthogonal projection, on the support plate (10), of the third copper-clad region (13) at least partially overlaps the first dipole arm (112), the second dipole arm (121) and the coupling gap (17); and a total effective length of the first dipole arm (112), the second dipole arm (121) and the third dipole arm (131) is 0.25 times a wavelength of a center frequency of the dipole antenna unit.

4. The dipole antenna unit according to claim 1, wherein the second dipole arm (20) is sheet metal, the second dipole arm (20) is parallel to the support plate (10) and extends in a direction away from the support plate (10), and a projection, on the support plate (10), of the second dipole arm (20) at least partially overlaps the first dipole arm (112);

the second dipole arm (20) and the first copper-clad region (11) are arranged on two surfaces, facing away from each other, of the support plate (10) respectively; and alternatively a surface of the first copper-clad region (11) is provided with a protective film (16), and the second dipole arm (20) is at least partially arranged on the protective film (16).

5. The dipole antenna unit according to claim 4, wherein a total effective length of the second dipole arm (20) and the first dipole arm (112) is 0.25 times a wavelength of a center frequency of the dipole antenna unit.

6. The dipole antenna unit according to claim 1, wherein the balun (111) comprises a feed line (1111), the feed line (1111) comprising a bent microstrip line; and a grounding line (1112), one end of the grounding line (1112) being connected to the feed line (1111).

7. The dipole antenna unit according to claim 6, further comprising a feed substrate (30), the feed substrate (30) being provided with two feed wires (31);

wherein the two support plates (10) are arranged on the feed substrate (30), and the feed lines (1111) of the two support plates (10) are connected to the corresponding feed wires (31) respectively.

8. The dipole antenna unit according to claim 6, wherein a middle of the support plate (10) is provided with a slot (14) perpendicular to a bottom edge of the support plate (10), and the support plate (10) comprises two plate units (15) located on two sides of the slot (14) respectively;

each plate unit (15) is provided with the first copper-clad region (11) and the second dipole arm (121, 20) separately, the first copper-clad regions (11) on the two plate units (15) are arranged in central symmetry with respect to the slot (14), and the second dipole arms (121, 20) on the two plate units (15) are arranged in central symmetry with respect to the slot (14); and one of the two plate units (15) of each support plate (10) is provided with the grounding line (1112), and the feed line (1111) is partially arranged on the other one of the two plate units (15).

9. The dipole antenna unit according to claim 1, further comprising a director (40) arranged above the support plate (10) at a predetermined interval, the director (40) being provided with a directing substrate (41) and a directing pattern (42) arranged on the directing substrate (41).

10. The dipole antenna unit according to claim 9, wherein the directing substrate (41) is provided with four directing arms (411), the four directing arms (411) are arranged on the same plane and rotationally symmetrical with respect to a center of the director (40) to form a vertical cross structure, an included angle between two adjacent directing arms (411) is 90°, and extension directions of the directing arms (411) are parallel to the corresponding support plates (10);

a middle of the directing substrate (41) is provided with a hollowed structure (412), the hollowed structure (412) extending from a center of the director (40) in the extension directions of the four directing arms (411) to form a vertical cross structure; and the directing pattern (42) and the directing substrate (41) have the same shape but different sizes.

11. The dipole antenna unit according to claim 10, wherein a width of the directing arm (411) is 0.08 times a wavelength of a center frequency of the dipole antenna unit; and the directing arm (411) is provided with a tail end far away from the center of the director (40), wherein a distance between tail ends of two directing arms (411) facing away from each other along the same straight line is 0.32 times the wavelength of the center frequency of the dipole antenna unit.

12. The dipole antenna unit according to claim 9, wherein a distance between the director (40) and a top edge of the support plate (10) is 0.05 times a wavelength of a center frequency of the dipole antenna unit.

13. A base station antenna, comprising a reflector (50); and a plurality of the dipole antenna units according to claim 1, the dipole antenna units being mounted on the reflector (50).

14. A dipole antenna unit, comprising:

two support plates (10), the two support plates (10) being perpendicularly crossed, each support plate (10) being provided with a first copper-clad region (11), and the first copper-clad region (11) comprising a balun (111) and a first dipole arm (112) connected to the balun (111);

wherein the dipole antenna unit is further provided with a second dipole arm (121, 20), the second dipole arm (121, 20) being coupled to the first dipole arm (112) in a non-contact manner, the second dipole arm (121, 20) comprises:

a first portion (1211, 21) provided with a first end and a second end which are opposite each other, wherein the first end is opposite the first dipole arm (112), and the second end extends in a direction away from the first dipole arm (112); and a second portion (1212, 22) provided with a third end and a fourth end which are opposite each other, wherein the third end is connected to a lower end of the second end of the first portion (1211, 21), the fourth end is located below the third end, the second portion (1212, 22) is perpendicular to the first portion (1211, 21), and a joint between the second portion (1212, 22) and the first portion (1211, 21) forms a bent structure.

15. The dipole antenna unit according to claim 14, wherein the second dipole arm (121, 20) is provided with a second corner cut (1213, 23), and the second corner cut (1213, 23) is arranged at the bent structure.

16. The dipole antenna unit according to claim 14, wherein a width of the first portion (1211, 21) is 0.035 times the wavelength of the center frequency of the dipole antenna unit, and a length of the second portion (1212, 22) is 0.02 times the wavelength of the center frequency of the dipole antenna unit.

* * * * *